Nov. 11, 1930.  P. F. WILLIAMS  1,781,145
CABLE HANGER
Filed Aug. 28, 1926
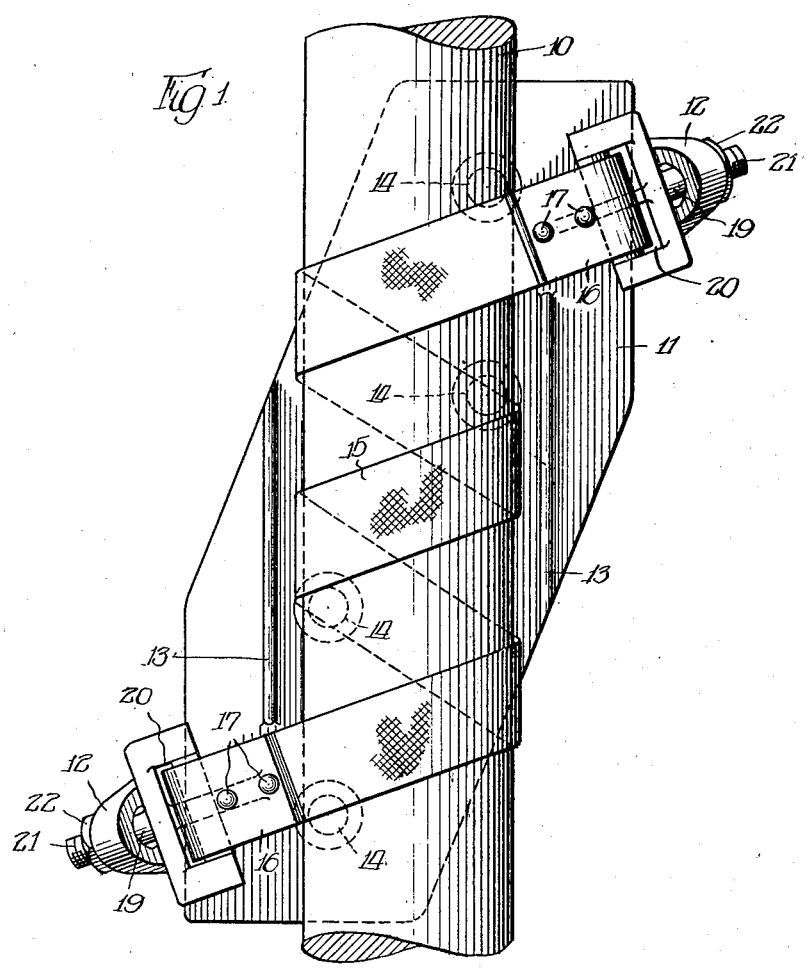
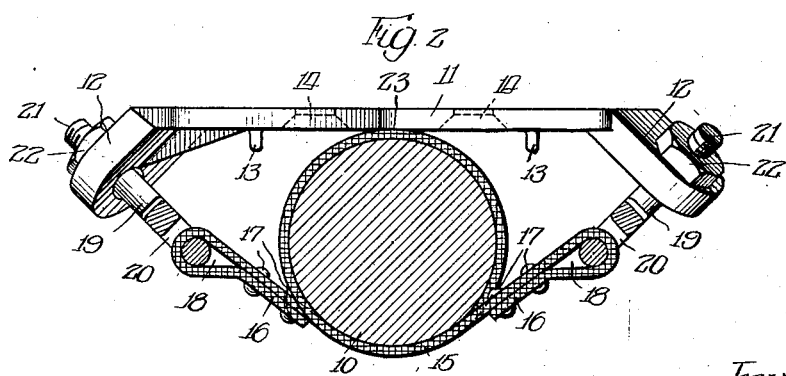
Inventor:
Paul F. Williams, Patented Nov. 11, 1930

1,781,145

UNITED STATES PATENT OFFICE

PAUL F. WILLIAMS, OF CHICAGO, ILLINOIS, ASSIGNOR TO G. & W. ELECTRIC SPECIALTY COMPANY, OF CHICAGO, ILLINOIS, A CORPORATION OF ILLINOIS

CABLE HANGER

Application filed August 28, 1926. Serial No. 132,131.

My invention relates to improvements in cable hangers and more especially to a type embodying a flexible strap element which is adapted to spirally engage a cable and secure the same to a supporting element in a suitable manner.

Heretofore in mounting cables of this general character, great difficulty was had in providing hangers which would accomplish efficiently various needs in the art. The type of cables referred to is usually encased in lead and the cables are of widely varying diameter for different installations, and it was often necessary in laying a cable of this type to hang certain portions of its length in a horizontal position and other portions in vertical or angular positions. The hangers now in use for the most part comprise various types of hard supports and hard cable engaging elements which contact the cable on a relatively small surface, with the result that the hanger cuts into and destroys the lead sheath of the cable, especially when used on large and heavy installations. It was necessary heretofore to provide several different types of hangers in suspending a single length of cable inasmuch as different problems were involved in supporting a cable when placed in vertical and horizontal positions, and thus no one type would serve for either position, and it has been further necessary to stock a variety of sizes to provide for installation of various sizes of cable.

It is the purpose of my invention to provide a cable hanger which is capable of installation on a cable of any size and weight with comparative ease, and which is further adapted to suspend a cable in either a horizontal or vertical position and without in any way damaging the lead sheath in which the cable is encased.

It is the further purpose of my invention to provide a cable hanger comprising as one of its elements a flexible strap member adapted to embrace and hold a cable and presenting a relatively large flat surface of a type which has high gripping qualities and which will not rub or cut the cable surfaces.

A further aim is to provide a cable hanger comprising a flexible strap and a supporting plate for holding the ends of the strap, together with adjustable attaching means so that the strap element may be readily adjusted to accommodate cables of various diameters.

A further aim is to provide a cable hanger which is adapted to hold a cable by means of a flexible strap by spiral engagement therewith in a manner to form an interposed contacting surface between the cable casing and the supporting plate. The strap is provided with a gripping surface which assumes a fixed position relative to the cable, when once placed in position, so that all relative movement and wear therefrom between the supporting plate and cable will occur on the outer surface of the interposed flexible strap and in this manner prolong the life of the cable. It will also be seen that due to the fact that the spiral suspension is fastened on diametrically opposed sides of the cable that any longitudinal slippage or any rotation tending to cause slippage will be prevented by a portion of the strap tightening around the cable.

The preferred embodiment of my invention will be more fully understood from the following detail description, reference being had to the accompanying drawing, in which like reference numerals represent corresponding parts. In the drawing—

Figure 1 shows a plan view of my device disclosing the cable, flexible strap and the supporting plate. This figure may also represent the hanger in a vertical position inasmuch as my device is equally efficient in any position, and Figure 2 is an end view of Figure 1, showing my invention as seen from above, being shown partly in cross-section.

Referring to the drawings, 10 represents a cable to be suspended, of the type provided with a lead casing, and 11 represents a supporting plate which is adapted to be attached to any suitable supporting element by which the cable is to be held and which is provided at its diagonally opposite corners with perforated lugs 12. Plate 11 is preferably provided with reinforcing ribs 13 and screw holes 14 which are counter-sunk to accommodate screws, thus providing means by which the bracket may be secured to a suitable support. 15 is a strap element of any suitable material which is flexible and yet durable enough to support the load of the cable to which it is applied but preferably made of some suitable form of mesh, such as woven wire or heavy woven fabric.

The ends of the strap 15 are bent back upon themselves as at 16 and held by any suitable means such as rivets 17 so as to form eyes 18 at the ends of the strap. Bolts 19 provided with eyes 20 at one end and screw threads 21 at the other end, are attached to the ends of the strap, which provide with the nuts 22, after the bolt has been placed in the lug 12, means for adjustably securing the end of the strap to the supporting plate 11.

In operation, when it is desired to suspend a cable, bracket 11 is mounted by suitable screws to any convenient support and positioned so as to receive centrally the cable. The flexible strap element 15 is spirally wound around the cable in the manner shown in Figure 1, the coils being adjusted according to the length of the strap and the diameter of the cable suspended so that the strap will tightly engage the surface of the cable and yet provide sufficient length at the ends to permit bolt 19 to be inserted through a hole in the lugs 12. When the cable has been thus mounted, nuts 22 may be tightened to cause the strap to firmly bind the cable against the stationary plate. It is to be noted that a special advantage is realized in this arrangement because the flexible strap which totally encircles the cable provides a protective seat between the cable and the plate 11, as shown at 23 in Figure 2, and any relative movement due to slippage between the cable and the plate 11 will occur between the strap and plate and thus protect the cable casing against all wear.

Due to the type of the strap element employed and the manner in which it engages the cable casing, all possibility of slippage between the strap and cable is eliminated, as any twisting or any longitudinal sliding movement is opposed by a tightening effect of the strap, thus providing a very efficient means for supporting a cable of any size and one which is equally well adapted for mounting in either a vertical or a horizontal position. In my hanger I have provided means for supporting a cable without resorting to hard wearing surfaces in contact with the cable casing, and in this manner I eliminate much of the trouble encountered in mounting large and heavy cables, especially when it is desired to support them in a vertical or inclined position.

It is to be understood, this detail description and disclosure is merely illustrative of a preferred embodiment of my invention and that it is my intention to include all forms falling within the scope of the appended claims.

I claim:

1. In a cable hanger, attaching means adapted to be fixed on a supporting element and having spaced lugs thereon, adjustable cable holding means comprising a flexible strap adapted to spirally engage a cable and having lug engaging elements at the ends thereof, said elements including a strap supporting head and a shank provided with means for adjustably holding said lug engaging elements in said lugs.

2. In a cable hanger for supporting a cable, the combination of attaching means adapted to be attached to a supporting element and having spaced lugs thereon, and a flexible flat element spirally engaging a cable, the ends of said flat element being attached to and held by said lugs to bind said flat element between and against said cable and attaching means to thereby prevent wear of said cable and to hold said cable in fixed relative position with respect to said attaching means.

3. In a device of the character described, the combination of a plate adapted to be immovably secured to a support, said plate having oppositely disposed fastening ears, means for supporting an object from said plate comprising, a flexible member adjustably secured to said ears and so disposed with respect to said plate as to contact the plate to provide wear means for said object, and said flexible member so embracing said object to tend to tighten its hold thereon in whatever position the plate may be disposed.

Signed at Chicago, Illinois, this 25th day of August, 1926.

PAUL F. WILLIAMS.